United States Patent
Angel et al.

(10) Patent No.: US 6,444,748 B1
(45) Date of Patent: Sep. 3, 2002

(54) PREPARING AQUEOUS POLYMER DISPERSIONS

(75) Inventors: Maximilian Angel, Schifferstadt; Karl Kolter, Limburgerhof; Axel Sanner, Frankenthal, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/456,514

(22) Filed: Dec. 8, 1999

(30) Foreign Application Priority Data

Dec. 15, 1998 (DE) .......................... 198 57 897

(51) Int. Cl.$^7$ ............................. C08J 29/00
(52) U.S. Cl. .............. 524/819; 524/802; 524/804; 526/348.2; 526/348.5; 526/348.6; 526/319; 526/328
(58) Field of Search ............... 524/802, 804, 524/819; 526/348.2, 348.5, 348.6, 319, 328

(56) References Cited

U.S. PATENT DOCUMENTS

| 3,784,498 A | | 1/1974 | Ceska ........................ 260/1 |
| 5,231,145 A | * | 7/1993 | Brueckmann et al. ...... 525/369 |
| 5,705,553 A | | 1/1998 | Kuropka ..................... 524/459 |

FOREIGN PATENT DOCUMENTS

| DE | 19642762 | 4/1998 |
| EP | 450437 A2 | 10/1991 |
| EP | 627450 A1 | 12/1994 |
| FR | 2180748 | 11/1973 |

OTHER PUBLICATIONS

H. Fikentscher et al., Angew. Chem 72(1960) pp. 856–864.
A. Alexander, Prog. Polym. Sci. 3 (1971) pp.145–197.
G. Markert, Angew. Makromol. Chem. (1984) pp. 285–295.
Houben–Weyl, 4th Ed., E20/2 pp. 1150–1156.
F. Hölscher, Dispersionen synthetischer Hochpolymerer, Part I (Springer Verlag Berlin, 1969) pp. 77–79.

* cited by examiner

Primary Examiner—David W. Wu
Assistant Examiner—William Cheung
(74) Attorney, Agent, or Firm—Keil & Weinkauf

(57) ABSTRACT

A process for preparing aqueous polymer dispersions by means of a polymerization, conducted in an aqueous system, of at least one free-radically polymerisable ethylenically unsaturated monomer in the presence of a polymerisation initiator, wherein the pH of the aqueous dispersion is adjusted during the preparation process by adding at least two different, basic reagents, at least one of said basic reagents being added in a plurality of stages.

13 Claims, No Drawings

PREPARING AQUEOUS POLYMER DISPERSIONS

The invention relates to a process for preparing aqueous polymer dispersions and to their use as auxiliaries for pharmaceutical administration forms.

A host of publications deal with the investigation of processes for preparing aqueous polymer dispersions; these include H. Fikentscher et al., Angew. Chem. 72 (1960) 856; A. Alexander, Prog. Polym. Sci. 3 (1971) 145; G. Markert, Angew. Makromol. Chem. 123/124 (1984) 285; Houben-Weyl, 4th ed., E20/2, 1150; EP-A-0 450 437 and EP-A-0 627 450.

Depending on the field of use, such polymer dispersions are frequently employed in fully or partly neutralized form. In this case, the dispersion can be neutralized either during or after the polymerization.

In this regard it is frequently observed that the storage stability, especially the pH stability, of neutralized, aqueous polymer dispersions is not always satisfactory. For instance, there may be unwanted drops in pH in the course of storage, as a result of which the properties of such dispersions may be drastically impaired.

As is known, furthermore, from the literature [Friedrich Höscher, Dispersionen synthetischer Hochpolymerer, Part I (Springer Verlag Berlin, 1969), page 77], the pH of the reaction system in polymerization plays an important part in respect of the polymerization rate, the residual monomer content after polymerization, and the colloidal stability of the system. For example, pH regulation by means of buffers may result in the formation of considerable amounts of electrolytes, which may lead to unwanted coagulation of the system.

It is an object of the present invention to provide a process for preparing storage-stable aqueous polymer dispersions of low monomer content without the abovementioned disadvantages.

We have found that this object is achieved in accordance with the invention by a process for preparing an aqueous polymer dispersion by polymerizing at least one free-radically polymerizable, ethylenically unsaturated monomer in an aqueous system in the presence of a polymerization initiator, which comprises adjusting the pH of the aqueous dispersion during the preparation process by adding at least two different, basic reagents, at least one of the basic reagents being added in a plurality of stages.

The free-radically polymerizable ethylenically unsaturated monomers employed in the process of the invention comprise compounds from the group consisting of $C_1$–$C_{24}$ alkyl esters of monoethylenically unsaturated $C_3$–$C_8$ carboxylic acids, $C_1$–$C_{24}$ alkyl esters of monoethylenically unsaturated $C_4$–$C_8$ dicarboxylic acids, vinyl esters of aliphatic $C_1$–$C_{24}$ carboxylic acids, amides of monoethylenically unsaturated $C_3$–$C_8$ carboxylic acids, $C_1$–$C_{24}$ alkyl vinyl ethers, N—$C_1$–$C_{24}$ alkyl-substituted amides of monoethylenically unsaturated $C_3$–$C_8$ carboxylic acids, N,N—$C_1$–$C_{24}$ dialkyl-substituted amides of monoethylenically unsaturated $C_3$–$C_8$-carboxylic acids, N-vinyllactams, N-vinylamines, styrene and butadiene.

Alkyl esters of monoethylenically unsaturated $C_3$–$C_8$ carboxylic acids and of monoethylenically unsaturated $C_4$–$C_8$ dicarboxylic acids include branched or unbranched $C_1$–$C_{24}$ alkyl esters, preferably methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, 2-ethylhexyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-docosyl- or n-tetracosyl esters.

Preferred representatives of the abovementioned alkyl radicals that may be mentioned are branched or unbranched $C_1$–$C_2$ and, with particular preference, $C_1$–$C_6$ alkyl radicals.

By monoethylenically unsaturated carboxylic acids of 3 to 8 carbon atoms are meant, for example, acrylic acid, methacrylic acid, dimethacrylic acid, ethacrylic acid, allylacetic acid, vinylacetic acid and crotonic acid. Preferred representatives from this group are acrylic acid and methacrylic acid.

By mondethylenically unsaturated dicarboxylic acids of 4 to 8 carbon atoms are meant, for example, representatives from the group consisting of maleic acid, fumaric acid, mesaconic acid and itaconic acid, preferably maleic acid.

By vinyl esters of aliphatic $C_1$–$C_{24}$ carboxylic acids are meant vinyl esters of aliphatic branched or unbranched, saturated or unsaturated $C_1$–$C_{24}$ carboxylic acids. Examples that may be mentioned include formic acid, acetic acid, propionic acid, butyric acid, valeric acid, isovaleric acid, caproic acid, caprylic acid, capric acid, undecylenic acid, lauric acid, myristic acid, palmitic acid, palmitoleic acid, stearic acid, oleic acid, arachidic acid, behenic acid, and lignoceric acid.

Preference is given to using vinyl esters of the abovementioned $C_1$–$C_{12}$ carboxylic acids, especially of the $C_1$–$C_6$ carboxylic acids.

By amides of monoethylenically unsaturated carboxylic acids of 3 to 8 carbon atoms are meant, for example, amides of acrylic acid, methacrylic acid, dimethacrylic acid, ethacrylic acid, allylacetic acid, vinyl acetic acid and crotonic acid. Preferred representatives from this group are acrylamide ($H_2C$=$CH$—$CO$—$NH_2$) and methacrylamide ($CH_2$=$C(CH_3)$—$CO$—$NH_2$).

It is also possible to polymerize $C_1$–$C_{24}$-alkyl vinyl ethers, preferably $C_1$–$C_{12}$-alkyl vinyl ethers.

Preferred $C_1$–$C_{12}$ alkyl radicals of the vinyl ethers that may be mentioned include branched or unbranched alkyl chains such as, for example, methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-Dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, 2-ethylhexyl, n-octyl, 2-ethylhexyl, n-nonyl, n-decyl, n-undecyl and also n-dodecyl radicals.

Further monomers which can be employed include N—$C_1$–$C_{24}$-alkyl- or N,N—$C_1$–$C_{24}$-dialkyl-substituted amides of monoethylenically unsaturated $C_3$–$C_8$ carboxylic acids, the alkyl radicals being branched or unbranched aliphatic alkyl radicals of 1 to 24 carbon atoms, examples being methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 2,2-dimethylpropyl, 1-ethyipryl, n-hexyl, 1,1-dimethylpropyl 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethybuty, 2,3-dimethylbutyl, 3,3-dim thylbutyl, 1-ethylbutyl, 2-ethybutyl 1,1,2-trimethylpropyl, 1,2,2-trimethylpropyl, 1-ethyl-1-methylpropyl, 1-ethyl-2-methylpropyl, n-heptyl, 2-ethylhexyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-docosyl or n-tetracosyl radicals, preferably such alkyl radicals having 1 to 12 and, with particular preference, 1 to 6 carbon atoms.

The amidated monoethylenically unsaturated carboxylic acids of 3 to 8 carbon atoms can, as already specified above, stand, for example, for acrylic acid, methacrylic acid, dimethacrylic acid, ethacrylic acid, allylacetic acid, vinylacetic acid and crotonic acid. Preferred representatives from this group are acrylic acid and methacrylic acid.

From this group of carboxylic acids, preference is likewise given to using acrylic acid and/or methacrylic acid.

Examples of preferred amidated comonomers are N-methylacrylamide, N-ethylacrylamide, N-n-propylacrylamide, N-1-methylethylacrylamide, N-n-butylacrylamide, N-1-methylpropylacrylamide, N-2-methylpropylacrylamide, N-1,1-dimethylethylacrylamide, N-n-pentylacrylamide, N-n-hexylacrylamide, N-methylmethacrylamide, N-ethylmethacrylamide, N-n-propylmethacrylamide, N-1-methylethylmethacrylamide, N-n-butylmethacrylamide, N-1-methylpropylmethacrylamide, N-2-methylpropylmethacrylamide, N-1,1-dimethylethylmethacrylamide, N-n-pentylmethacrylamide, N-n-hexylmethacrylamide.

As N-vinyllactams or N-vinylamines mention may be made of compounds selected from the group consisting of N-vinylpyrrolidone, N-vinylpiper idone, N-vinylcaprolactam, N-vinylimidazole, methylated N-vinylimidazole and N-vinylformamide.

In order to increase the solubility of the polymers in water it is possible to use additional monomers comprising, inter alia, acrylamidomethylpropanesulfonic acid and its salts or vinylsulfonic acid and its salts.

Of course, mixtures of each of the abovementioned monomers can also be polymerized.

The monomers employed with particular preference for the process of the invention are the abovementioned $C_1$–$C_6$ alkyl esters of acrylic acid and methacrylic acid, especially methyl acrylate, ethyl acrylate, methyl methacrylate and/or ethyl methacrylate.

Very particular preference is given to copolymers containing from 50 to 75% by weight of the abovementioned acrylates and from 50 to 25% by weight of the above methacrylates.

In order to prepare the polymers, the monomers can be polymerized in conventional manner both with the aid of free-radical initiators and by the action of high-energy radiation, a term which is intended to include the action of high-energy electrons.

Suitable polymerization initiators include organic peroxides and hydroperoxides, such as diacetyl peroxide, dibenzoyl peroxide, succinyl peroxide, di-tert-butyl peroxide, tert-butyl perbenzoate, tert-butyl perpivalate, tert-butyl permaleate, cumene hydroperoxide, diisopropyl peroxidicarbamate, bis(o-toluoyl)peroxide, didecanoyl peroxide, dioctanoyl peroxide, dilauroyl peroxide, tert-butylperisobutyrate, tert-butyl peracetate, di-tert-amyl peroxide, tert-butylhydro peroxide; inorganic percompounds, such as alkali metal peroxodisulfates, ammonium peroxodisulfate or $H_2O_2$; redox initiators such as $H_2O_2$/ascorbic acid, $H_2O_2$/$Fe^{2+}$, peroxodisulfates/thiosulfates, peroxides/thiosulfates; azo initiators such as 4,4'-azobisisobutyronitrile, and mixtures of said initiators.

Preferred representatives of the abovementioned polymerization initiators are ammonium peroxodisulfate, the acidic alkali metal peroxodisulfates, especially the sodium and potassium salts, and also the redox initiators $H_2O_2$/ascorbic acid.

The amounts of initiator or initiator mixtures used, based on monomer employed are from 0.01 to 10% by eight, preferably from 0.1 to 1.5% by weight and, with particular preference from 0.15 to 0.8% by weight.

Examples of emulsifiers used are ionic or nonionic surfactants.

Preferred emulsifiers are anionic emulsifiers such as lauryl sulfate, sodium stearate, potassium oleate and, in particular, $C_{15}$ paraffinsulfonate. Suitable nonionic emulsifiers are preferably the ethoxylation products of p-n-octylphenol, p-n-nonylphenol, p-n-decylphenol with a degree of ethoxylation from 3 to 200, preferably from 10 to 120, and also products of the ethoxylation of lauryl alcohol, oleyl alcohol, stearyl alcohol, oleamide and stearamide and oleylamide and of stearic and oleic acid with a degree of ethoxylation of from 3 to 20. Also suitable, furthermore, are cationic emulsifiers such as ammonium, phosphonium and sulfonium compounds having at least one long aliphatic hydrocarbon chain as a hydrophobic moiety.

The emulsifiers, which are important for an emulsion polymerization, are employed in amounts from 0.1 to 10% by weight, preferably from 0.1 to 5.0% by weight, based on monomer employed.

It has surprisingly now been found that regulating the pH during the preparation process of aqueous polymer dispersions by adding at least two different, basic reagents, at least one of the basic reagents being added in a plurality of stages, promotes the formation of coagulum-free, low-monomer and pH-stable polymer dispersions.

The above term "preparation process" means, for the purposes of the invention, the overall process for preparing aqueous polymer dispersions, beginning with the polymerization, a postpolymerization carried out if desired, and a stabilization, following the polymerization, of the prepared polymer dispersions by adjusting the pH to from 6 to 10.

It is advantageous here if at least one of the basic reagents has "buffer" properties. Buffer properties of this kind are found, for example, in salts of weak acids (see CD Römpp Chemie Lexikon-Version 1.0, Stuttgart/New York: Georg Thieme Verlag 1995).

In addition to these buffer substances, the pH regulation can in principle be carried out using all organic and inorganic bases, especially those bases which are soluble in water.

In one preferred embodiment at least one of the basic reagents employed is a salt of an acid selected from the group consisting of carbonic acid, boric aid, acetic acid, citric acid and phosphoric acid, and a further basic reagent comprises at least one base selected from the group consisting of alkali metal hydroxides and alkaline earth metal hydroxides, ammonia, and primary and secondary and tertiary amines.

Preferred salts of the abovementioned weak acids are alkali metal salts and alkaline earth metal salts, with particular preference being given to sodium, potassium and magnesium salts. Especially preferred buffer substances are sodium acetate, sodium citrate, sodium pyrophosphate, potassium pyrophosphate, sodium hydrogen carbon and/or sodium borate. In addition it is also possible to use salts of unsaturated weak carboxylic acids, such as acrylic acid or methacrylic acid, for example.

Examples of alkali metal hydroxides and alkaline earth metal hydroxides include sodium hydroxide, potassium hydroxide, magnesium hydroxide, and calcium hydroxide.

Examples of primary, secondary and tertiary amines include ethylamine, diethylamine, triethylamine, n-propylamine, di-n-propylamine, tri-n-propylamine, ethylenediamine, triethanolamine and aniline.

The basic reagents which are used with preference in addition to the abovementioned buffer substances are sodium hydroxide, potassium hydroxide, calcium hydroxide and/or ammonia, sodium hydroxide being particularly preferred.

It is an advantage if during the preparation process of the aqueous polymer dispersions at least one of the basic reagents, and especially one or more of the abovementioned buffer substances, is added in at least two stages.

In the context of the use in accordance with the invention of the different, basic reagents for adjusting the pH, these reagents can be added either in unison or individually. It is an advantage if the addition of each of the different, basic reagents takes place at different times.

One preferred embodiment of the process of the invention is that wherein a) at least one representative of the abovementioned free-radically polymerizable, ethylenically unsaturated monomers, preferably $C_1$–$C_6$ alkyl esters of acrylic acid and methacrylic acid and, with particular preference, methyl acrylate, ethyl acrylate, methyl methacrylate and ethyl methacrylate, is polymerized in the presence of an acidic polymerization initiator, preferably sodium or potassium peroxodisulfate, at a pH in the range from 1 to 7.5, preferably in the range from 3 to 7.5 and, with particular preference, in the range from 4 to 7.0, the pH being kept constant by adding a salt of an acid selected from the group consisting of carbonic acid, boric acid, acetic acid, citric acid and phosphoric acid, preferably by adding sodium acetate, sodium citrate, sodium pyrophosphate or potassium pyrophosphate, sodium hydrogen carbonate and/or sodium borate, b) following consumption of the polymerization initiator, the reaction mixture is postpolymerized without pH regulation and/or without further addition of buffer, in order to reduce the monomer content, c) the aqueous dispersion obtained following polymerization is buffered by further addition of a salt of an acid selected from the group consisting of carbonic acid, boric acid, acetic acid, citric acid and phosphoric acid, preferably by addition of sodium acetate, sodium citrate, sodium pyrophosphate, potassium pyrophosphate, sodium hydrogen carbonate and/or sodium borate, and d) subsequently this dispersion is adjusted to a pH from 6 to 10, preferably from 7 to 9, by adding a base selected from the group consisting of alkali metal hydroxides and alkaline earth metal hydroxides and also ammonia, preferably sodium hydroxide and/or potassium hydroxide or wherein, following step b), of the process, the polymer dispersion is first adjusted to a pH of from 6 to 10, preferably from 7 to 9, in accordance with step d), and then step c) is performed.

The polymerization of the invention, especially the process in accordance with step a) of the process, can be conducted either batchwise or semibatchwise. It is preferable to operate with the semibatch process in which, for example, a portion, generally 10%, of the amount of polymerization initiator, emulsifier, buffer substance and monomer required for the polymerization is introduced as an initial charge, this mixture is heated to polymerization temperature and, following the onset of the polymerization, the remainder, i.e., in each case polymerization initiator and monomer, is metered in simultaneously by way of separate feed streams, the pH during the polymerization being kept constant by adding at least one of the above buffer substances.

The polymerization takes place within the temperature range from 40 to 200° C., preferably within the range from 50 to 140° C. and, with particular preference, in the range from 60 to 100° C. It is normally conducted under atmospheric pressure but may also take place under subatmospheric or superatmospheric pressure, preferably from 1 to 5 bar.

Depending on batch size, the reaction times are normally from 1 to 10 hours, usually from 1.5 to 5 hours.

To reduce the monomer content of the aqueous polymer dispersion following the polymerization of step a) of the process it is possible to heat the aqueous dispersion briefly at temperatures from 90 to 100° C., at atmospheric or subatmospheric pressure, in order to remove the residual monomers in gaseous form. Any possible formation of foam here can be prevented by adding antifoams.

A further and preferred method of reducing the monomer content in the context of the process of the invention is that of post-polymerization, in which, by adding further initiators, preferably redox initiators and, with paticular preference, a mixture of $H_2O_2$, ascorbic acid and iron(II) sulfate, the amount of monomers can be reduced to a level <100 ppm, preferably <20 ppm. During the postpolymerization the pH may fall by up to 4 units. Such a shift in the pH can be prevented by adding, if desired, more of the abovementioned buffer substances. However, it has been found that it is advantageous to dispense with pH regulation in the course of the postpolymerization.

For the preparation of storage-stable aqueous polymer dispersions it is further of advantage, following complete reaction of the polymerizable monomers in accordance with steps a) and b) of the process, to adjust the system to a pH in the range from 6 to 10, preferably in the range from 7 to 9.

Especially in view of a pH-stable aqueous polymer dispersion it is of advantage, after the polymerizable monomers have reacted completely, in accordance with step b) of the process, to buffer the pH of the system initially by further addition of at least one salt of an acid selected from the group consisting of carbonic acid, boric acid, acetic acid, citric acid and phosphoric acid to a pH in the range from 5 to 7 and then, by adding at least, one base selected from the group consisting of alkali metal hydroxides and alkaline earth metal hydroxides, ammonia, and primary, secondary and tertiary amines, to establish the desired final pH in the range from 6 to 10, preferably in the range from 7 to 9.

An alternative option is initially to add at least one of the abovementioned bases, following complete polymerization, and then to add the buffer, or else to add both simultaneously.

The K values of the polymers lie within the range from 10 to 250, preferably from 30 to 200, more preferably from 50 to 150 and, with very particular preference, in the range from 70 to 120. The particular desired K value can be established in a conventional manner by way of the composition of the starting materials. The K values are determined in accordance with Fikentscher, Cellulosechemie, 13 (1932) 58 to 64 and 71 to 74 in N-methylpyrrolidone at 25° C. and at polymer concentrations of from 0.1 to 5% by weight depending on the K value range.

The solids content of the resultant aqueous polymer dispersions or solutions is generally from 10 to 70% by weight, preferably from 15 to 65% by weight and, with particular preference from 20 to 60% by weight.

The invention additionally provides aqueous polymer dispersions obtainable by the polymerization process described at the outset. Preference is given to those polymer dispersions which are based on free-radical polymerizable $C_1$–$C_6$ alkyl esters of acrylic acid and/or methacrylic acid, especially methyl acrylate, ethyl acrylate, methyl methacrylate and/or ethyl methacrylate. The dispersions have a residual monomer content of less than 100 ppm, preferably less than 20 ppm.

The aqueous polymer dispersions can be converted to powder form by various drying techniques such as, for example, spray drying, including fluidized spray drying, roller drying or freeze drying. The advantageous low viscosity of the polymer dispersions makes the use of spray drying the preferred drying technique.

If necessary, it is also possible when drying to add spraying aids such as, for example, highly disperse silica, silicates, starch and/or starch derivatives, cellulose and/or cellulose derivatives, polyvinylpyrrolidones, and polyvinyl alcohols.

By redispersing the resultant dry polymer powder in water it is possible to reconstitute an aqueous dispersion or solution. Conversion to powder form has the advantage of simplifying the transport options and reducing the likelihood of microbial infestation.

The invention therefore also provides polymer powders prepared by drying the aqueous polymer dispersions produced by the process of the invention. Depending on the composition of the polymers, the polymer powders concerned may be soluble, dispersible or insoluble in water.

The water-soluble or water-dispersible polymers of the invention are outstandingly suitable as film formers, binders, wetting aids and/or solubilizers which are soluble or dispersible in gastric fluid, for pharmaceutical administration forms.

The water-insoluble polymers of the invention are outstandingly suitable as delayed-release polymers for delaying the release of active substances, for stabilizing drugs, and for masking the taste and/or odor of active substances having an unpleasant taste or odor.

A preferred field of use of the water-dispersible or water-insoluble polymers is their use as coating compositions for solid pharmaceutical administration forms.

Because of their extreme flexibility and low viscosity, it is generally unnecessary to add any plasticizers when the polymers are used as coating compositions.

The invention additionally provides pharmaceutical administration forms comprising at least one water-soluble or water-dispersible or water-insoluble polymer as coating composition, binder and/or film-forming auxiliary, said polymer, which may be employed either as an aqueous dispersion or as a polymer powder, being obtainable by the process of the invention already described at the outset.

The coated administration forms preferably comprise, inter alia, film-coated tablets, film-coated microtablets, sugar-coated tablets, coated pastilles, capsules, crystals, granules, and pellets.

The binder-containing administration forms preferably comprise, inter alia, tablets, microtablets, cores, granules, and pellets.

The following examples illustrate the preparation of the aqueous polymer dispersions of the invention.

PREPARATION OF THE POLYMERS

EXAMPLE 1

| A solution of | |
|---|---|
| 497.1g | of water |
| 3.5g | of sodium lauryl sulfate (15%) |
| 53.7g | of feedstream 1 | was heated to 75° C., 7.5 g of sodium peroxodisulfate (7%) were added, and then feedstreams 1 and 2 were added continuously over the course of 2 hours at 80° C. and at a pH of 7.

| Feedstream 1: | |
|---|---|
| 500.7g | of water |
| 22.6g | of ethoxylated nonylphenol (100 EO units) |
| 17.5g | of sodium pyrophosphate (3%) |
| 7.0g | of sodium lauryl sulfate (15%) |
| 369.0g | of ethyl acrylate |
| 158.1g | of methyl methacrylate |
| Feedstream 2: | |
| 21.1g | of sodium peroxodisulfate (2.5%) |

The batch was subsequently postpolymerized for 1.5 hours, then cooled to room temperature, and, in succession, a solution of 0.2 g of hydrogen peroxide (30%) in 8.9 g of water and a solution of 0.3 g of ascorbic acid and 0.5 g of iron(II) sulfate (1%) in 23.7 g of water were added. Following this step, the pH of the dispersion was 4.

The pH was subsequently adjusted successively to 6 by adding 17.6 g of sodium pyrophosphate (3%) and to 8.5 by further adding a 10% strength aqueous solution of NaOH.

COMPARATIVE EXAMPLE 1

| A solution of | |
|---|---|
| 497.1g | of water |
| 3.5g | of sodium lauryl sulfate (15%) |
| 53.7g | of feedstream 1 | was heated to 75° C., 7.5 g of sodium peroxodisulfate (7%) were added, and then feedstreams 1 and 2 were added over the course of 2 hours at 80° C. and at a pH of 8.

| Feedstream 1: | |
|---|---|
| 500.7g | of water |
| 22.6g | of ethoxylated nonylphenol (100 EO units) |
| 35.1g | of sodium pyrophosphate (3%) |
| 7.0g | of sodium lauryl sulfate (15%) |
| 369.0g | of ethyl acrylate |
| 158.1g | of methyl methacrylate |
| Feedstream 2: | |
| 21.1g | of sodium peroxodisulfate (2.5%) |

The batch was subsequently postpolymerized for 1.5 hours, then cooled to room temperature, and, in succession, a solution of 0.2 g of hydrogen peroxide (30%) in 8.9 g of water and a solution of 0.3 g of ascorbic acid and 0.5 g of iron(II) sulfate (1%) in 23.7 g of water were added. Following this step, the pH of the dispersion was 6.

The pH was subsequently adjusted to 8.5 by adding a 10% strength aqueous solution of NaOH.

COMPARATIVE EXAMPLE 2

| A solution of | |
|---|---|
| 497.1g | of water |
| 3.5g | of sodium lauryl sulfate (15%) |
| 53.7g | of feedstream 1 | was heated to 75° C., 7.5 g of sodium peroxodisulfate (7%) were added, and then feedstreams 1 and 2 were added over the course of 2 hours at 80° C. and at a pH of 7.

| Feedstream 1: | |
|---|---|
| 500.7 g | of water |
| 22.6 g | of ethoxylated nonylphenol (100 EO units) |
| 17.5 g | of sodium pyrophosphate (3%) |
| 7.03 g | of sodium lauryl sulfate (15%) |
| 369.0 g | of ethyl acrylate |
| 158.1 g | of methyl methacrylate |
| Feedstream 2: | |
| 21.1 g | of sodium peroxodisulfate (2.5%) |

The batch was subsequently postpolymerized for 1.5 hours, then cooled to room temperature, and, in succession, a solution of 0.2 g of hydrogen peroxide (30%) in 8.9 g of water and a solution of 0.26 g of ascorbic acid and 0.5 g of iron(II) sulfate (1%) in 23.7 g of water were added. Following this step, the pH of the dispersion was 4.

The pH was subsequently adjusted to 8.5 by adding a 10% strength aqueous solution of NaOH.

EXAMPLE 2

The polymer dispersions prepared in accordance with Example 1 and in accordance with the Comparatives Examples 1 and 2 were analyzed for their monomer content and were subjected to a storage stability test. The results are summarized in the table below.

| Polymer dispersion | Coagulum [%][1) | pH 2) | pH 3) | Residual monomer content [ppm] |
|---|---|---|---|---|
| Example 1 | 0.1 | 8.5 | 8.1 | Ethyl acrylate: <10<br>Methyl methacrylate: <10 |
| Comparative Example 1 | 0.15 | 8.5 | 8.0 | Ethyl acrylate: 300<br>Methyl methacrylate: 20 |
| Comparative Example 2 | 0.1 | 8.5 | 7.4 | Ethyl acrylate: < 10<br>Methyl methacrylate: <10 |

[1)]Measured after filtering the aqueous dispersion through a 120 μm sieve
[2)]measured directly after preparing the finished dispersion;
[3)]measured after storage for two weeks As is evident from the Table, the polymer dispersion prepared in accordance with the process of the invention (Example 1) shows the best storage stability (pH stability) coupled with the desired low residual monomer content and low proportion of coagulum.

EXAMPLE 3

Delayed-release Coating of Caffeine Pellets

In a fluidized bed coater (Strea 1, from Aeromatic) 500 g of caffeine pellets having a diameter of from 0.7 to 1.4 mm were coated with a 30% dispersion of ethyl acrylate-methyl methacrylate copolymer from Example 1. The dispersion was sprayed onto the pellets by means of the Wurster process. The coating formulation had the following composition:

| Ethyl acrylate-methyl methacrylate copolymer dispersion (30%) | 41.66% |
|---|---|
| Talc | 12.5% |
| Antifoam Pharsil 21046 VP | 0.025% |
| Water | 45.815% |

The incoming air temperature was set at 450° C., while the temperature of the outgoing air was 27° C. A total of 477.2 g of spray suspension were applied at a spraying rate of 15 g/min. After the end of spray application, drying was carried out at 45° C. for 3 minutes.

After coating, the pellets had a smooth surface. The release of the active substance was determined in a release apparatus in accordance with USP 23 (from Pharmatest PTW), release taking place in the first two hours in 0.08 N HCl (simulated gastric fluid) and subsequently in phosphate buffer pH 6.8 (simulated intestinal fluid).

| The following release data were obtained: | |
|---|---|
| 1 h | 1% |
| 2 h | 2% |
| 4 h | 11% |
| 8 h | 55% |
| 12 h | 70% |
| 24 h | 95% |

EXAMPLE 4

Transdermal Therapeutic System 10 g of propranolol-HCl and 30 g of polyethylene glycol 400 were dissolved in 100 g of water and this solution was stirred slowly into 860 g of a 30% by weight dispersion of ethyl acrylate-methyl methacrylate copolymer prepared in accordance with Example 1. Following the addition, stirring was continued slow for 1 h. This formulation was drawn down onto a polyester sheet (Hostaphan®, Hoechst) on a film drawing apparatus (from Erichsen) with a 100 μm coater bar, and was dried at 55° C. Coating and drying were each repeated until the thickness of the dry film was 150 μm.

We claim:

1. A process for preparing an aqueous polymer dispersion by polymerizing at least one free-radically polymerizable ethylenically unsaturated monomer in an aqueous system in the presence of a polymerization initiator, which comprises adjusting the pH of the aqueous dispersion during the preparation process by adding at least two different, basic reagents, at least one of the basic reagents being added in a plurality of stages.

2. A process as claimed in claim 1, wherein the addition of the different, basic reagents is made at different times.

3. A process as claimed in claim 1, wherein the polymerization takes place in the presence of an acidic polymerization initiator.

4. A process as claimed in claim 1, wherein at least one of the basic reagents employed is a salt of an acid selected from the group consisting of carbonic acid, boric acid, acetic acid, citric acid and phosphoric acid and a further basic reagent comprises at least one base selected from the group consisting of alkali metal hydroxides, alkaline earth metal hydroxides, ammonia, primary amines, secondary amines, and tertiary amines.

5. A process as claimed in claim 1, wherein the free-radically polymerizable ethylenically unsaturated monomers comprise compounds selected from the group consisting of $C_1$–$C_{24}$ alkyl esters of monoethylenically unsaturated $C_3$–$C_8$ carboxylic acids, $C_1$–$C_{24}$ alkyl esters of monoethylenically unsaturated $C_4$–$C_8$ dicarboxylic acids, vinyl esters of aliphatic $C_1$–$C_{24}$ carboxylic acids, amides of monoethylenically unsaturated $C_3$–$C_8$ carboxylic acids, $C_1$–$C_{24}$ alkyl vinyl ethers, N-$C_1$–$C_{24}$ alkyl-substituted amides of monoethylenically unsaturated $C_3$–$C_8$ carboxylic acids, N,N-$C_1$–$C_{24}$ dialkyl-substituted amides of monoethylenically unsaturated $C_3$–$C_8$ carboxylic acids, N-vinyllactams, styrene, and butadiene.

6. A process as claimed in claim 1, wherein the free-radically polymerizable ethylenically unsaturated monomers comprise $C_1$–$C_6$ alkyl esters of acrylic acid and/or methacrylic acid.

7. A process as claimed in claim 1, wherein the addition of at least one of the basic reagents takes place in at least two stages.

8. A process as claimed in claim 1, wherein the addition of a salt of an acid selected from the group consisting of carbonic acid, boric acid, acetic acid, citric acid and phosphoric acid takes place in at least two stages.

9. A process as claimed in claim 1, wherein a) at least one free-radically polymerizable, ethylenically unsaturated monomer is polymerized in the presence of an acidic polymerization initiator at a pH in the range from 1 to 7.5, the pH being kept constant by adding a salt of an acid selected from the group consisting of carbonic acid, boric acid, acetic acid, citric acid and phosphoric acid, b) following consumption of the polymerization initiator, the reaction mixture is postpolymerized without pH regulation in order to reduce the monomer content, c) the aqueous dispersion obtained following polymerization is buffered by further addition of a salt of an acid selected from the group consisting of carbonic acid, boric acid, acetic acid, citric acid and phosphoric acid, and d) subsequently this dispersion is adjusted to a pH from 6 to 10 by adding a base selected from the group consisting of alkali metal hydroxides, alkaline earth metal hydroxides, and, or wherein, following step b), of the process, the polymer dispersion is first adjusted to a pH of from 6 to 10 in accordance with step d), and then step c) is performed.

10. A process as claimed in claim 9, wherein the ethylenically unsaturated monomer and the polymerization initiator in step a) are, in a semi-batch procedure, metered into the polymerization reactor simultaneously by way of separate feedstreams.

11. A process as claimed in claim 9, wherein a redox system is used as initiator for the postpolymerization in step b).

12. A process as claimed in claim 9, wherein a redox system consisting of $H_2O_2$, ascorbic acid and/or iron(II) sulfate is used as initiator for the postpolymerization in step b).

13. A process as claimed in claim 9, wherein steps c) and d) are conducted simultaneously.

* * * * *

UNITED STATES PATENT AND TRADEMARK OFFICE
CERTIFICATE OF CORRECTION

PATENT NO. : 6,444,748 B1
DATED : September 3, 2002
INVENTOR(S) : Angel et al.

It is certified that error appears in the above-identified patent and that said Letters Patent is hereby corrected as shown below:

<u>Column 12,</u>
Line 18, after "and" insert -- ammonia, --.

Signed and Sealed this

Seventeenth Day of December, 2002

JAMES E. ROGAN
*Director of the United States Patent and Trademark Office*